United States Patent
Grove et al.

(10) Patent No.: US 12,547,625 B2
(45) Date of Patent: Feb. 10, 2026

(54) CLASSIFICATION-BASED QUERY JOIN REORDERING FOR RELATIONAL DATABASE SYSTEMS AND APPLICATIONS

(71) Applicant: NVIDIA Corporation, Santa Clara, CA (US)

(72) Inventors: Andrew Francis Grove, Broomfield, CO (US); Nuttiiya Seekhao, Alexandria, VA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/618,378

(22) Filed: Mar. 27, 2024

(65) Prior Publication Data
US 2025/0307246 A1    Oct. 2, 2025

(51) Int. Cl.
*G06F 16/20* (2019.01)
*G06F 16/2453* (2019.01)

(52) U.S. Cl.
CPC .............. *G06F 16/24544* (2019.01)

(58) Field of Classification Search
CPC ................................ G06F 16/24544
See application file for complete search history.

(56) References Cited

U.S. PATENT DOCUMENTS

2009/0112793 A1* 4/2009 Ahmed ............... G06F 16/2456
707/E17.054

OTHER PUBLICATIONS

Jaffray, J., "An indroduction to join ordering", Cockroachlabs, Oct. 23, 2018. pp. 1-17.
Margoor, A., et al., "Improving Join Reordering for Large Scale Distributed Computing", 2020 IEEE International Conference on Big Data, Oct. 17, 2023. pp. 2812-2819.

* cited by examiner

*Primary Examiner* — Kristopher Andersen
(74) *Attorney, Agent, or Firm* — Shook, Hardy & Bacon L.L.P.

(57) ABSTRACT

In various examples, table classification based query join reordering for relational database systems and applications are provided. In some embodiments, a relational database system is provided that includes a join optimizer that evaluates a join clause of a query and categorizes relational database tables as either fact tables or dimension tables based on a normalized cardinality statistic. The join optimizer uses the fact and dimension tables to deconstruct the query into a plurality of deconstructed query join trees. Individual deconstructed query join trees may be generated for each respective fact table. The deconstructed query join trees may be joined to generate a reordered join solution representing a sequential join of the plurality of deconstructed query join trees. An updated query may be generated based on the reordered join solution, and a query response generated that answers the query based at least on the updated query.

18 Claims, 6 Drawing Sheets

CLASSIFICATION-BASED QUERY JOIN REORDERING FOR RELATIONAL DATABASE SYSTEMS AND APPLICATIONS

BACKGROUND

In a relational database system, data is organized into tables where each table represents some type of entity. For example, a database system for a retail business may include a table of customers, a table of products available to purchase, and a table of customer orders. As such, a query submitted to a relational database system may call for the database system to search for data from data records across multiple tables to generate a response to the query. Join reordering refers to a process in which the order in which tables are joined in the query are rearranged to optimize the retrieval of data from the multiple tables. By selecting the right order for joining tables, the amount of data that needs to be processed, and the overall time to execute a query, can be improved.

SUMMARY

Embodiments of the present disclosure relate to table classification based query join reordering for relational database systems and applications.

In contrast to conventional systems, one or more embodiments disclosed herein provide for a relational database system that includes a join optimizer that evaluates a join clause of a query and categorizes a plurality of relational database tables as either fact tables or dimension tables based on cardinality (e.g., based on computing a normalized cardinality statistic). The join optimizer uses the fact tables and dimension tables to deconstruct the query into a plurality of join trees, referred to as deconstructed query join trees. The join optimizer may parse the join clause of the query to identify which tables of the relational database are involved in the join clause and then classify individual tables into a first class of tables that are designated as fact tables, and a second class of tables that are designated as dimension tables. The determination of whether to classify a table as a fact table or a dimension table may be based on cardinality (e.g., a normalized cardinality statistic). In some embodiments, the normalized cardinality statistics may be computed for each table of the join clause as a function of a ratio between the logarithm of the size of a largest table from the set of tables identified from the join clause and the sizes of the other individual tables identified from the join clause. Another normalized cardinality statistic that may be used to determine whether to classify a table as a fact table or dimension table is the z-score. For the purpose of determining whether to classify a table as a fact table or dimension table, the z-score for a table may be used to determine whether the table is unusually large (e.g., a fact table) or relatively small (e.g., a dimension table).

Individual deconstructed query join trees may be generated for each respective fact table, where each respective deconstructed query join tree includes one or more dimension tables from the set of dimension tables that are to be joined to the fact table for that join tree, as specified by the join clause of the query. Once a set of deconstructed query join trees is generated from the fact tables and dimension tables, the deconstructed query join trees may be joined to generate a reordered join solution representing a join (e.g., a sequential join) of the plurality of deconstructed query join trees. If constructing a join tree would involve performing a join with a dimension table that the system does not support, then that join may be omitted from the join tree. Such tables may be referred to as residual tables. In some embodiments the join optimizer may further extend the reordered join solution by adding a join between the residual tables and reordered join solution.

An updated query may be generated based on the reordered join solution, and a query response generated that answers the query based at least on the updated query. In some embodiments, the query response may include the same information as if it were produced directly based on the join order indicated by the join clause of the query.

BRIEF DESCRIPTION OF THE DRAWINGS

The present systems and methods for table classification based query join reordering for relational database systems and applications are described in detail below with reference to the attached drawing figures, wherein.

DETAILED DESCRIPTION

Figure 1:
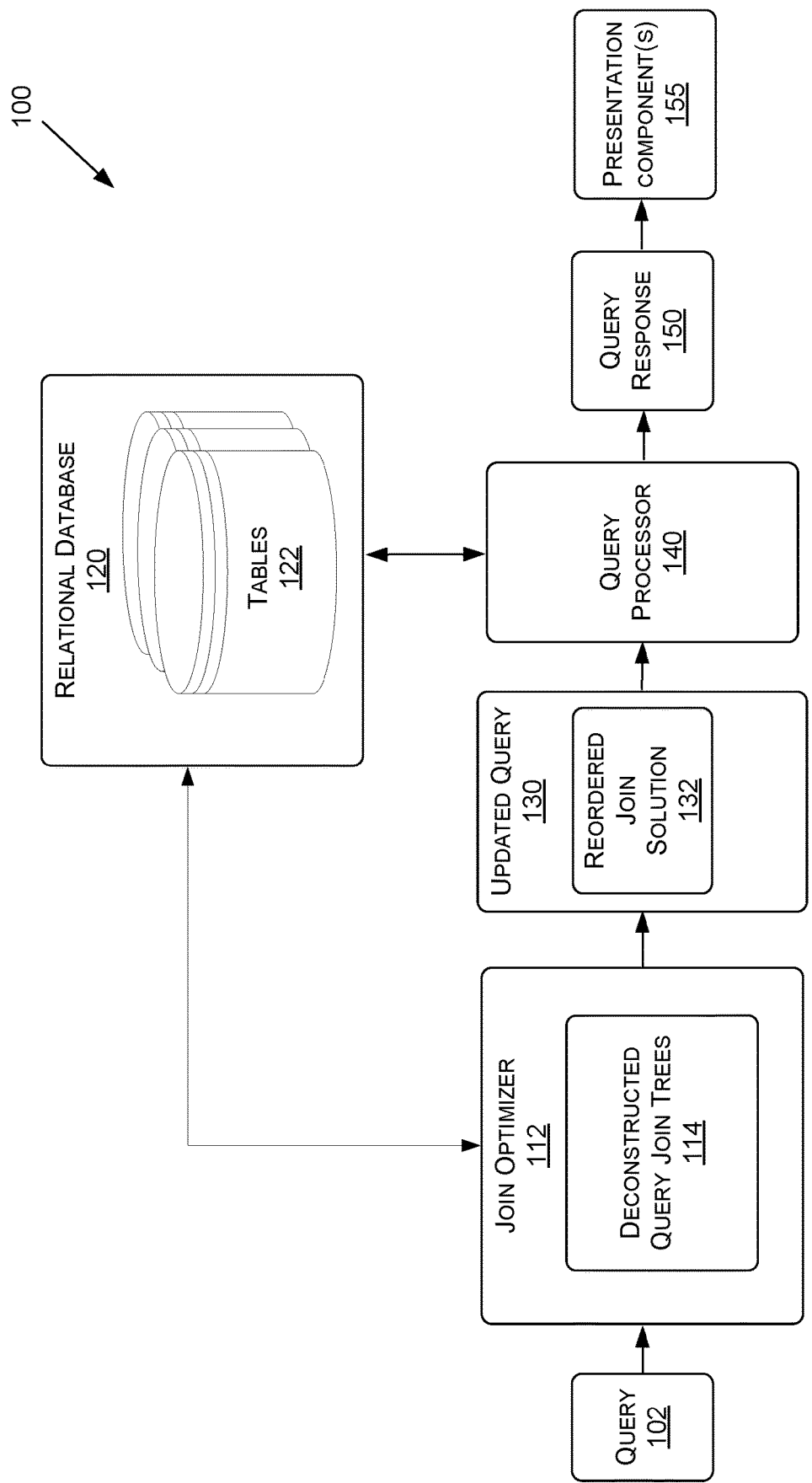
FIG. 1 is a data flow diagram for an example relational database system, in accordance with some embodiments of the present disclosure.

The present disclosure relates to table classification based query join reordering for relational database systems and applications. As discussed herein, systems and methods are provided that evaluate a join clause of a query and generate an output comprising a reordered join (which may be referred to as a reordered join solution) representing a join of a plurality of join trees each comprising fact and dimension tables.

Join reordering refers to a process in which the order in which tables are joined in the query are rearranged to optimize the retrieval of data from the multiple tables. By selecting the right order for joining tables, the amount of data that needs to be processed, and the overall time to execute a query, can be improved.

Heuristics-based algorithms are one form of join reordering that may be used by a traditional database management system (DBMS). Heuristics-based algorithms use predefined rules, such as transforming a query tree into a left-deep tree and/or ordering tables for joining based on size and selectivity. While heuristics-based rules are typically simple to implement and consume little compute overhead to implement, the resulting join order may not result in optimal results in all cases. Cost-based algorithms represent another type of join reordering algorithm. Cost-based algorithms use statistical information about the data and the database system to estimate the cost of executing different query plans and select the one with the lowest cost. But a downside to cost-based algorithms is that computing the statistical information is a non-trivial effort involving processing the data in each of the tables of the database at substantial costs in terms of computing resources. In some instances, computing the statistical information may be more compute intensive than directly executing a query without join reordering. Machine language-based algorithms represent a type of join reordering algorithm that uses machine learning techniques to learn from past query execution data and predict the cost of different query plans. These algorithms have the ability to adapt to changes in the data and the database system but require a significant amount of training data and may produce sub-optimal results caused by a lack of diversity in the training data.

In contrast to prior technologies, one or more embodiments disclosed herein provide for a join optimizer that evaluates a join clause of a query and categorizes each relational database table of a plurality of relational database tables as either fact tables or dimension tables based on computing a cardinality (e.g., a normalized cardinality statistic) for a respective relational database table and then deconstructing the query into a plurality of join trees. Each join tree may represent the joining (e.g., sequential joining) of a fact table with one or more dimension tables, based on join operations defined by the join clause of the query. Within a join tree, the order in which dimension tables are joined to the fact table may be determined by a ranking that may be based at least on a respective size of each individual dimension table. For example, the one or more dimension tables may be ranked from smaller size to larger size such that smaller dimension tables are joined with the fact table before larger size dimension tables. In some embodiments, the size used for ranking dimension tables may be adjusted by a filter factor that accounts for filtering specified by the join clause. That is, the filter factor accounts for the fact that when a dimension table is filtered, the resulting filtered dimension table may be smaller in size than the unfiltered dimension table. A reordered join solution may be generated by sequentially joining the plurality of join trees. In some embodiments, the join trees may be joined based on an order in which the respective fact tables appear in the join clause of the query. In some embodiments, the join trees may be joined in a sequential order based on the size of each join tree's respective fact table (e.g., based on increasing fact table size, with join trees that have smaller fact tables joined before join tables having larger fact tables). An updated query may be generated based on the reordered join solution, and a query response generated that answers the query based at least on the updated query.

Generally, fact tables and dimension tables are concepts that arise from star schema type relational databases. Fact tables often comprise records (e.g., rows) that are used to record details and/or measurements associated with a specific event. Dimension tables are typically smaller in size than fact tables, and the records of a dimension table may store data that includes attributes that further describe the data found in fact tables. That said, depending on the set of tables specified in the query and/or join clause, a table that functions as a fact table for one query may function as a dimension table for another query. Similarly a table that functions as a dimension table for one query may function as a fact table for another query.

In some embodiments, the join optimizer may parse the join clause of a query to identify which tables of a relational database are involved in the join clause and then classify individual tables into a first class of tables that are designated as fact tables, and a second class of tables that are designated as dimension tables. The determination of whether to classify a table as a fact table or a dimension table may be based on cardinality (e.g., a normalized cardinality statistic). For example, in some embodiments, a normalized cardinality statistic may be computed for each table of the join clause as a function of a ratio of the logarithm (e.g., a natural logarithm, a base10 logarithm, or other base logarithm) of the size of a largest table from the set of tables identified from the join clause (which may be referred to as a baseline table) and the logarithm of the sizes of the other individual tables. Using the ratio of the logarithms, a score may be computed for individual tables and the tables classified as fact or dimension tables based on the score. As an example, in one implementation, the baseline table may have a cardinality of 100,000 rows (or tuples). Since the ratio of the size of the baseline table to itself is equal to one, the score for the baseline table may be computed, for example, as ln(100000)/ln(100000)=1. Other tables identified from the join clause may have, for example 7000 rows, 1000 rows, and 200 rows. The score of the 7000 row table may be computed as ln(7000)/ln(100000)=0.77, the score of the 1000 row table may be computed as ln(1000)/ln(100000) =0.60, and the score of the 200 row table may be computed as ln(200)/ln(100000)=0.46. The baseline table, by default, may be classified as a fact table. Which of the other tables are considered fact tables may be established based on comparing their respective score to a classification threshold. For example, if the threshold for fact tables is set at 0.70, then the baseline table and the 7000 row table will be classified as fact tables, and the 1000 and 200 row tables will be classified as dimension tables. The threshold used for distinguishing fact from dimension tables may be selected based on characteristics of the tables that make up the relational database, and that results in the separation of fact from dimension tables that provides the most relevant query results. Because the sizes of tables to be joined in a relational database query can differ from each other by multiple orders of magnitude, merely computing and considering their ratios can result in widely different ranges of values depending of the sizes of tables to be joined, thus making it difficult to assess what threshold should be used a priori for a particular query. In contrast, taking a ratio of the logarithm of tables sizes (e.g., a natural log, base 10 log, or other base logarithm) normalizes the scores so that a threshold can more readily be selected that is applicable across the relationship database and the tables expected to be selected for joining by the join clause.

Another normalized cardinality statistic that may be used to determine whether to classify a table as a fact table or dimension table is the z-score. A z-score is a statistic that may be used to detect outliers within a population of data that exhibits a distribution close to a normal distribution. A z-score is a normalized statistic that may be computed from the expression:

$$z = \frac{x - \mu}{\sigma}$$

where x may represent a sample value (e.g., the size of the table being scored), $\mu$ represents the mean of the population (e.g., the mean size of all tables that exist in the database schema), and $\sigma$ represents the standard deviation of the population (e.g., the standard deviation of the size of all tables that exist in the database schema). For the purpose of determining whether to classify a table as a fact table or dimension table, the z-score for a table may be used to determine whether the table is unusually large (e.g., a fact table) or relatively small (e.g., a dimension table). For a relational database schema, the fact tables may be expected to grow at much faster paces than the dimension tables such that the fact tables may have significantly larger sizes. Accordingly, the z-scores of small tables for such a relational database schema can be expected to cluster together while the z-scores for large tables spread out with a distance far from the mean value and the cluster of small tables. A table with the smallest z-score is most likely a dimension table and its z-score may therefore be used as a representative value for accepting or rejecting other tables as dimension tables based on their individual z-scores. A baseline z-score may be established as the minimum z-score (e.g., min-zs=min(z-scores)). Each table that has a z-score within the range of [min_zs−$\varepsilon$, min_zs+$\varepsilon$] may be classified as a dimension table, and the others classified as fact tables. The value of $\varepsilon$ can be configurable so that a user running a query can tune $\varepsilon$ to obtain classification of fact and dimension tables that yield the most accuracy, thus giving the join-reordering algorithm more precise table information to work with.

As discussed above, once the set of fact tables and the set of dimension tables is established, a join tree may be generated for each respective fact table, where each respective join tree includes one or more dimension tables from the set of dimension tables that are to be joined to the fact table for that join tree, as set forth by the join clause. Moreover, within a join tree, the join optimizer may attempt to join the dimension tables to the fact table in a specific order that yields a more efficient processing of the join clause.

In some embodiments, the dimension tables selected for a join tree may be ranked in order of increasing table size. That is, the smallest dimension tables are sequentially joined with the fact table first and followed by the joining of dimension tables of increasing size. In some embodiments, the ranking of dimension tables may be adjusted to accommodate for the effective size of a dimension table after application of a filter specified by the join clause. In other words, the effective size of a filtered dimension table may be smaller than the full size of the dimension table because only a subset of the full dimension table is joined after application of the filter. For example, if the join clause of the query applies a filter to limit the query to customer orders for products of origin from either Germany or the United States, then a dimension table that includes a product country of origin column may be filtered down in size to include records with Germany or the United States in the country of origin column, and excluding records that do not have Germany or the United States in the country of origin column.

In some embodiments, for the dimension tables of a join tree that are filtered, the value of the full size of the table is adjusted by a configurable filter selectivity factor to determine the effective size of the table. For example, a filter selectivity factor having a value between 0 and 1 may be applied to (e.g., multiplied with) the full size of a filtered dimension table to produce an effective size for that dimension table that at least roughly reflects the effects of filtering on the table's size. A filter selectivity factor having a value of 1 would effectively indicate that the application of the filter would not be expected to have any effect on the table's size so that the effective size for that dimension table equals the full size. In some embodiments, a filter selectivity factor may be a default value (which may be user selected). For example, a user may specify a filter selectivity factor of 0.8 for filtered dimension tables, for which the join optimizer will multiply the full size of each filtered dimension table by 0.8 to compute an effective size that may be used for purposes of ranking dimension tables within the join tree. In some embodiments, the filter selectivity factor may be applied on a per-filter basis. For example for a dimension table where three filters are applied before the table is joined with the fact table, the filter selectivity factor (e.g., 0.8) may be applied three times to produce a net size adjustment (e.g., 0.8×0.8×0.8=0.512). Once the effective size for each dimension table is computed, the join optimizer may produce a first list that ranks the filtered dimension tables in increasing order of effective size (e.g., with the smallest size first), and a second list that ranks the unfiltered dimension table in the order in which they were specified by the join clause of the query. The final ranking of dimension tables for the join tree may then be sequentially produced by selecting the smallest of the two dimension tables currently at the top of the two lists and adding that table to the sequence of dimension tables of the join trees. The selection may be repeated until both the first list and the second list are empty and no table remains in either list. As an alternative, in some embodiments, the second list that includes the unfiltered dimension tables may be sorted by size from smallest to largest rather than in the order in which they were specified by the join clause. The generation of join trees may be performed until a join tree is computed for each fact table, where each join tree represents a table classified as a fact table, joined sequentially with one or more tables classified as dimension tables—based on the tables and joins specified by the join clause.

In some embodiments, within the context of a join tree, dimension tables from the set of dimension tables are selected (for joining with the fact table) based on the join clause specifying a join that includes those dimension tables. The join clause may specify different types of joins such as, but not limited to, an inner join, a left join, a right join, and/or other types of joins. If constructing a join tree would involve performing a join with a dimension table that the system does not support, then that join may be omitted from the join tree. In some embodiments, such an un-joined dimension table may be considered a residual table and addressed as further explained below.

Once a set of join trees is generated from the fact tables and dimension tables, the join trees may be joined to generate a reordered join solution representing a join (e.g., a sequential join) of the plurality of join trees. Based on the reordered join solution, the database system may generate a response to the query message. In some embodiments, the query response may include the same information as if it were produced directly based on the join order indicated by the join clause of the query. That said, by generating the response from the joins of the reordered join solution, the processioning of the query may be achieved more efficiently with respect to time, processing cycles, memory usage, and/or other compute considerations because the generation of intermediate data and tables is optimized so that as each join is performed, a smaller amount of data needs to be stored and processed as compared to what would be generated by the original join order indicated by the join clause.

In some embodiments, to produce the reordered join solution, the join trees may be sequentially joined based on the order in which the fact tables appear in the join clause of the query. Alternatively, in some embodiments, to produce the reordered join solution, the join trees may be sequentially joined based on the size of the fact table. That is, the join optimizer may sequentially join the fact tables in order of increasing size of their constituent fact table. For some implementations, the size of a fact table may be based on the number of records (e.g., rows) of the fact table. In some implementations, the size of a fact table may be based on factors that reflect the shape of the data, such as the number of data columns of the fact table and/or the amount of the data reflected in the table records (e.g., the size of the fact table as measured in bytes).

As mentioned herein, after joining of the join trees to form the reordered join solution, one or more tables specified in the original join clause may remain un-joined. Such tables may be referred to as residual tables, and may be the result of the join clause specifying a join type not supported by the join optimizer and/or database system. In some instances, residual tables may occur because the join clause may have specified a join between dimension tables or fact tables that was otherwise not realized in the generation of join trees and/or the joining of join trees. As such, in some embodiments the join optimizer may further extend the reordered join solution by adding a join between the residual tables and reordered join solution. When the residual tables can be joined with the reordered join solution so that no un-joined table remains from the tables specified by the join clause of the query, then an updated query based on the original query and the reordered join solution may be processed by the database system to produce the query response. If one or more un-joined tables do remain that cannot be joined with the reordered join solution, then the join optimization may be canceled and the query performed using the join order specified by the original query, or a different join optimization technique may be attempted.

With reference to FIG. 1, FIG. 1 is an example data flow diagram for a relational database system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by one or more processors (e.g., processing circuitry) executing instructions stored in memory.

As shown in FIG. 1, the relational database system 100 comprises a query processor 140 that may access tables 122 of a relational database 120 in order to produce a query response 150 to a query 102 received, for example, as input from a user of the relational database system 100. In response to a query 102 submitted to the relational database system 100, the query processor 140 may search the tables 122 for data from data records across multiple tables 122 to generate the query response 150. In some embodiments, the relational database system 100 comprises a join optimizer 112 that evaluates a join clause of the query 102. The join optimizer 112 identifies tables from the relational database 120 that comprise records to be searched to perform the query 102 and categorizes those identified tables as either fact tables or dimension tables based on computing a normalized cardinality statistic. Using the fact tables and dimension tables, the join optimizer 112 generates a plurality of deconstructed query join trees 114. As discussed below with respect to FIG. 2, each join tree of the plurality of deconstructed query join trees 114 may represent the sequential joining of a fact table with one or more dimension tables, based on join operations defined by the join clause of the query 102. The join optimizer 112 may generate a reordered join solution 132 by then sequentially joining the individual join trees from the plurality of deconstructed query join trees 114.

An updated (e.g., modified, revised, etc.) query 130 may be produced by the join optimizer 112 based on the original query 102 and the reordered join solution 132. The query processor 140 of the relational database system 100 may input or otherwise receive the updated query 130 and access the tables 122 of the relational database 120 to produce a query response 150 responsive to the original query 102. The query response 150 may be displayed to a data presentation component (e.g., such as presentation component(s) 518 in FIG. 5 or other human-machine interface (HMI)) and/or saved to a memory or data storage device for further processing. In some embodiments, the query response 150 produced from the updated query 130 may include the same information as if it were produced directly based on the join order indicated by the join clause of the original query 102. By generating the query response 150 from the joins of the reordered join solution 132, the processing of the query by the query processor 140 may be achieved more efficiently with respect to time, processing cycles, memory usage, and/or other compute considerations because the generation of intermediate data and tables is optimized so that as each join is performed, a smaller amount of data needs to be stored and processed as compared to what would be generated by the original join order indicated by the join clause.

Figure 2:
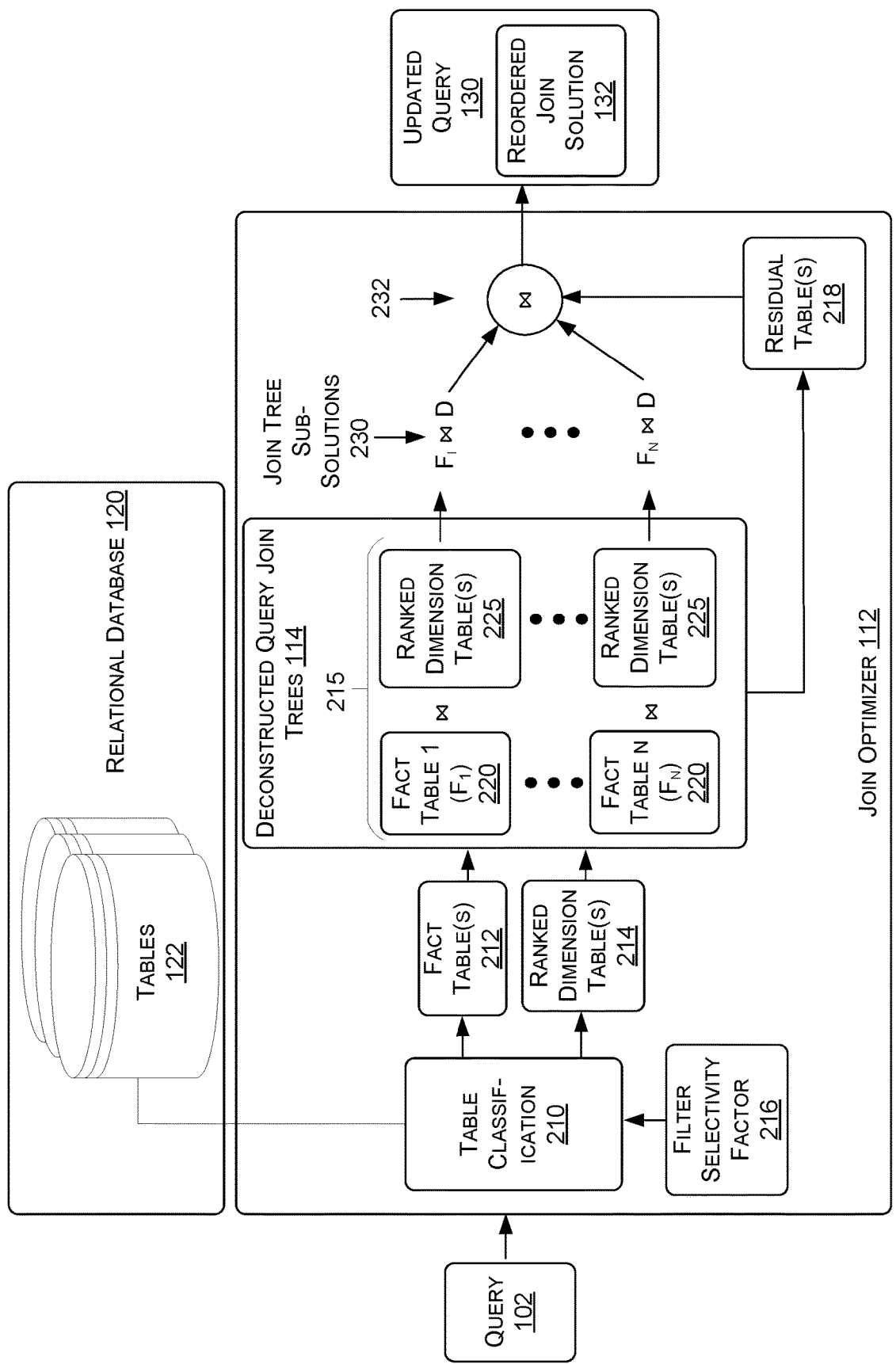
FIG. 2 is a diagram for an example join optimizer for a relational database system, in accordance with some embodiments of the present disclosure.

Referring now to FIG. 2, FIG. 2 illustrates an example embodiment of join optimizer 112. As shown in FIG. 2, in some embodiments the join optimizer 112 comprises a table classification function 210 that references the tables 122 of relationship database 120 to derive a set of fact tables 212 and a set of ranked dimension tables 214. The table classification function 210 may receive the query 102 (e.g., a query issued by a user to the system 100) and parse a join clause of the query 102 to identify which tables 122 of the relational database 120 are involved in the join clause. Each of the tables 122 included in the join clause that are identified from the relationship database 120 by the table classification function 210 may by classified into a first class of tables that are designated as the fact tables 212, or into a second class of tables that are designated as dimension tables 214. In some embodiments, the table classification function 210 may apply a normalized cardinality statistic to determine which of the tables 122 included in the join clause are classified as the fact tables 212 and which are classified as the dimension tables 214. As discussed herein, the largest table in the set of tables identified by the table classification function 210 may be referred to as a baseline table. A normalized cardinality statistic for each of the other tables identified by the table classification function 210 may be computed as a function of a ratio between the logarithms of the size of the baseline table and the other individual tables identified from the join clause. Using the ratio of the logarithms of the table sizes, an individual score may be computed by the table classification function 210 each of the tables and the tables classified as fact or dimension tables based on the score. The baseline table, by default, may be classified as a fact table 212. Which of the other table are considered fact tables 212 versus dimension tables 214 may be established based on comparing their respective score to a classification threshold. The classification threshold used by the table classification function 210 for distinguishing fact from dimension tables may be selected based on characteristics of the tables 122 that make up the relational database 120, and the threshold further selected based on a division of fact tables 212 from dimension tables 214 that provides the most relevant query results to the user. As such, in some embodiments, the classification threshold may be a user selected input and/or may be included as a parameter of the query 102. In some embodiments, the table classification function 210 may apply a z-score as a normalized cardinality statistic to determine whether to classify a table as a fact table 212 or dimension table 214. A z-score is a statistic that may be used to detect outliers within a population of data that exhibits a distribution close to a normal distribution. For the purpose of determining whether to classify a table as a fact table or dimension table, the z-score for a table may be used by the table classification function 210 to determine whether the table is unusually large (e.g., a fact table 212) or relatively small (e.g., a dimension table 214). A baseline z-score may be established as the minimum z-score (e.g., min-zs=min(z-scores)). Each table that has a z-score within the range of [min_zs−ε, min_zs+ε] may be classified by the table classification function 210 as a dimension table 214, and the others classified as fact tables 212. The value of & can be configurable and serve as the classification threshold so that a user running a query can tune & to obtain classification of fact tables 212 and dimension tables 214 that yield the most accurate table classification results. As such, in some embodiments, the value of & may be a user selected input and/or may be included as a parameter of the query 102.

In some embodiments, table classification function 210 may produce a set of ranked dimension tables 214 that is ranked based on a criteria, such as in order of increasing table size for example. In at least one example embodiment, the smallest of the dimension tables 214 are ranked highest (e.g., so that they may be sequentially joined with the fact table first) and followed by dimension tables of increasing size. In some embodiments, the ranking of dimension tables may be adjusted by the table classification function 210 to accommodate for the effective size of a dimension table after application of a filter specified by the join clause. That is, the query 102 may specify that a filter is to be applied to limit the query which may cause one or more of the dimension tables to be filtered down in size to include records that satisfy the filter. As a result, the number of records from a filtered table relevant to the join may be less than the full size of the filtered table. Accordingly, in some embodiments, table classification function 210 may apply filter selectivity factor 216 to the full size of a filtered dimension table to compute an effective size for that dimension table that reflects the effects of filtering on the table's size. In some embodiments, the filter selectivity factor 216 may be a default value used by the table classification function 210 to compute an effective size that may be used for purposes of rankings for producing the ranked dimension tables 214.

In some embodiments, to produce the set of ranked dimension tables 214, the table classification function 210 may produce a first list that ranks filtered dimension tables in an increasing order of effective size, and a second list that ranks the unfiltered dimension table in the order in which they were specified by the join clause of the query 102. The final set of ranked dimension tables 214 may be produced by sequentially selecting the smallest table from between the first list and the second list and adding that table to the sequence of the ranked dimension tables 214. The selection may be repeated until both the first list and the second list are empty and no table remains in either list. As an alternative, in some embodiments, the table classification function 210 may sort the second list that includes the unfiltered dimension tables by size from smallest to largest rather than in the order in which they were specified by the join clause.

Once the set of fact tables 212 and the set of ranked dimension tables 214 have been generated by the table classification function 210, the join optimizer may proceed to generate a plurality of deconstructed query join trees 114 from the set of fact tables 212 and the set of ranked dimension tables 214. As discussed herein, each individual deconstructed query join tree 215 may comprise a fact table 220 from the set of fact tables 212 and a subset of ranked dimension tables 225 selected from the set of ranked dimension tables 214. Within the context of each individual deconstructed query join tree 215, the dimension tables 225 selected from the set of dimension tables 214 are selected for joining with the respective fact table 220 based on an indication from the join clause to join those dimension tables to complete the query. A join clause from the query 102 may specify joins such as, but not limited to, an inner join, a left join, a right join, and/or other types of joins.

Figure 3:
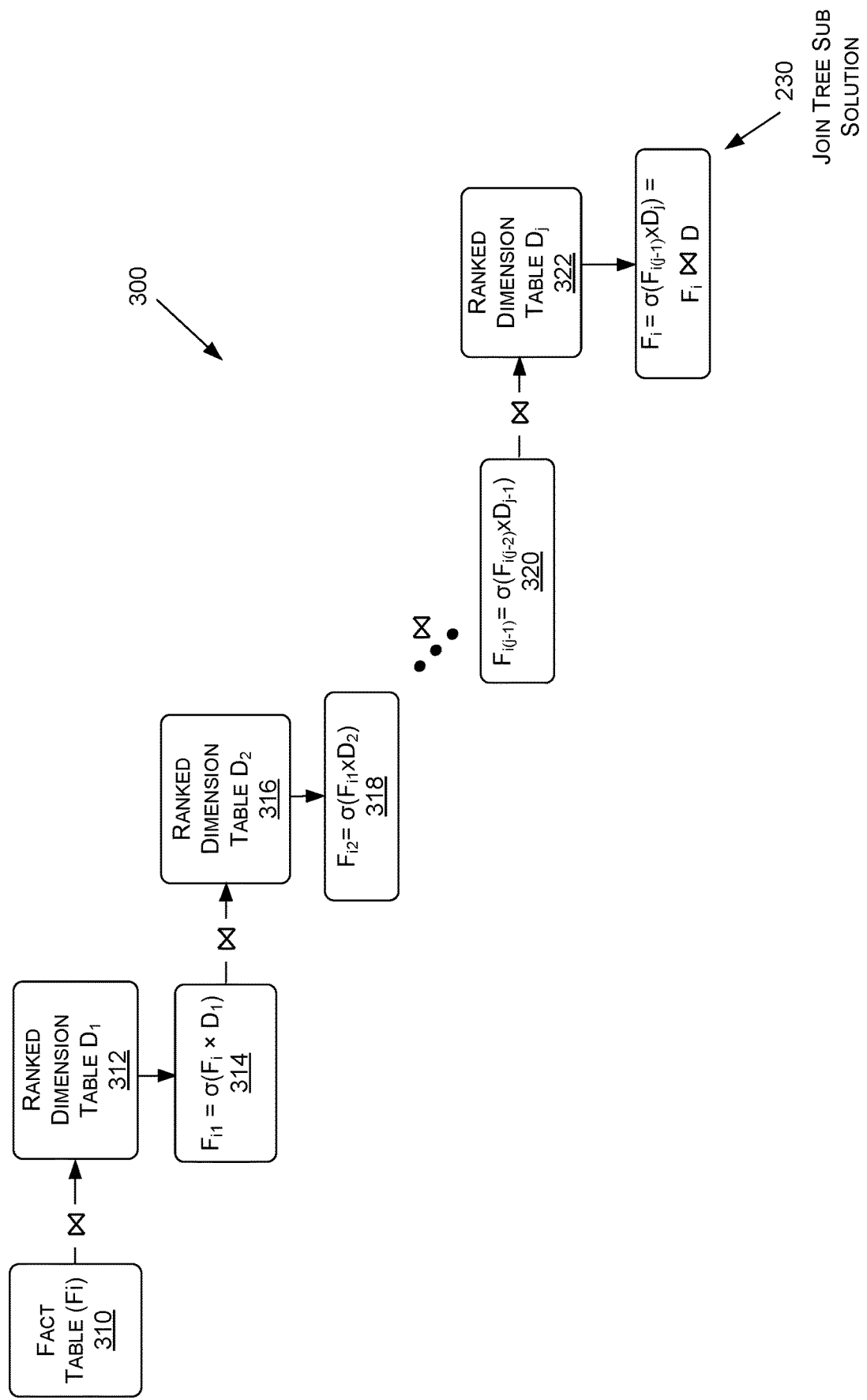
FIG. 3 is a diagram illustrating construction of a join-tree sub-solution for defining a plurality of deconstructed query join trees for a join optimizer, in accordance with some embodiments of the present disclosure.

As shown in FIG. 2, for each individual deconstructed query join tree 215 of the plurality of deconstructed query join trees 114, a join-tree sub-solution 230 is constructed based on joining (e.g., sequentially joining) the dimension tables 225 in the order of their ranking with the respective fact table 220. FIG. 3 is a diagram 300 that illustrates an example construction of such a join-tree sub-solution 230. As shown in FIG. 3, in some embodiments, generating a join-tree sub-solution 230 may begin with the fact table 220 for that individual deconstructed query join tree 215. Starting with the fact table 220, a highest ranked dimension table 312 from the ranked dimension tables 225 is joined with the fact table 220 to produce a first intermediate join 314. That first intermediate join 314 may then be joined with the next highest ranked dimension table 316 from the ranked dimension tables 225 may then be joined with the first intermediate join 314 to produce a second intermediate join 318. The remaining tables from the ranked dimension tables 225 may be similarly joined (e.g., in sequence) with an intermediate join produced from the preceding join until the final intermediate join 320 is joined with the last ranked dimension table 322 to produce the join tree sub-solution 230.

If during the process of constructing an individual join-tree sub-solution 230 the join optimizer 112 determines that joining a dimension table would involve performing an unsupported join, then the unsupported join of that dimension table may be omitted from that individual join-tree sub-solution 230. In some embodiments, a dimension table from the set of ranked dimension tables 214 that remains un-joined after generation of the join-tree sub-solution 230 may be considered a residual table 218 as shown in FIG. 2.

Referring back to FIG. 2, in some embodiments, to produce the reordered join solution 132, the join-tree sub-solution 230 may be joined by the join optimizer 112 as shown at 232. That is, the set of join-tree sub-solutions 230 may represent a plurality of join trees that may be joined (e.g., sequentially joined) to generate the reordered join solution 132. In some embodiments, the join-tree sub-solutions 230 may be joined in the order in which the base fact tables 220 appear in the join clause of the query 102. In some embodiments, the join optimizer 112 at 232 may join the join-tree sub-solutions 230 in an order based on the size of their associated fact table 220 (e.g., in order of increasing size). The size of a fact table 220 may be determined based on factors that reflect the shape of the table's data records, such as the number of data columns, the amount of the data reflected in the table records (e.g., the size of the fact table 220 as measured in bytes), or based on other criteria.

In some embodiments the join optimizer 112 may further extend the reordered join solution 132 by incorporating a join between one or more residual tables 218 and the reordered join solution 132. An updated (e.g., modified, revised, etc.) query 130 based on the original query 102 and the reordered join solution 132 (extended with the one or more residual tables 218) may be processed by the relational database system 100 to produce the query response 150. If one or more residual tables 218 remain un-joined (e.g., because they specify a type of join that cannot be joined with the reordered join solution 132), then in some embodiments, the join optimization process may be canceled and a response to the query 102 performed using the join order specified by the original query 102, or a different join optimization technique, may be applied to produce a reordered join solution 132 to generate the updated query 130.

As discussed above, in some embodiments, the join optimizer 112 may produce an updated query 130 based on the original query 102 and the reordered join solution 132. The query processor 140 of the relational database system 100 may input or otherwise receive the updated query 130 and access the tables 122 of the relational database 120 to produce a query response 150 responsive to the original query 102. The query response 150 may be displayed to a data presentation component (e.g., such as presentation component(s) 518) and/or saved to a memory or data storage device for further processing. In some embodiments, the query response 150 produced from the updated query 130 may include the same information as if it were produced directly based on the join order indicated by the join clause of the original query 102. By generating the query response 150 from the joins of the reordered join solution 132, the processioning of the query by the query processor 140 may be achieved more efficiently with respect to time, processing cycles, memory usage, and/or other compute considerations because the generation of intermediate data and tables is optimized so that as each join is performed, a smaller amount of data needs to be stored and processed as compared to what would be generated by the original join order indicated by the join clause.

Figure 4:
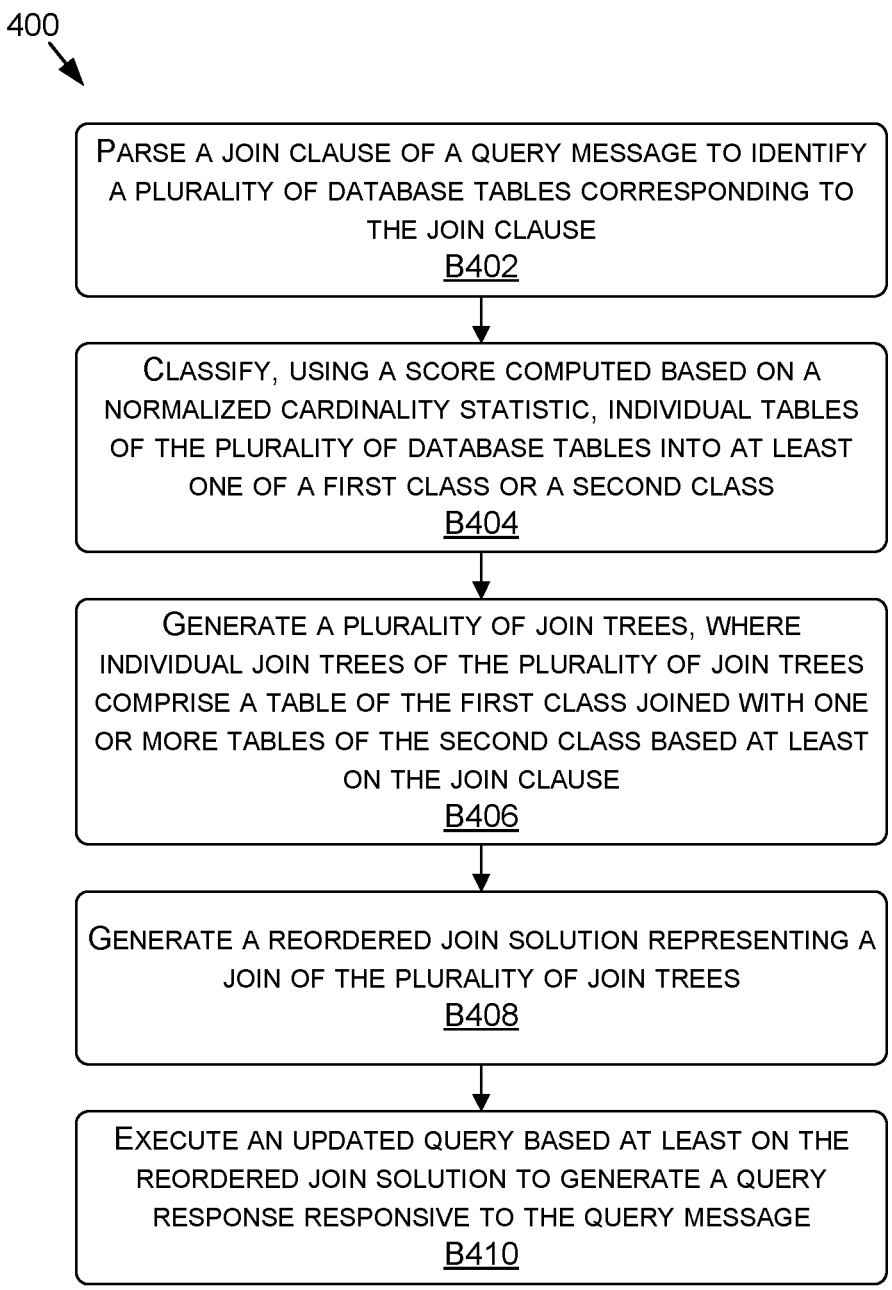
FIG. 4 is a flow chart illustrating a method for a join reordering process, in accordance with some embodiments of the present disclosure.

Now referring to FIG. 4, FIG. 4 is a flow diagram showing a method 400 for a join reordering process, in accordance with some embodiments of the present disclosure. It should be understood that the features and elements described herein with respect to the method 400 of FIG. 4 may be used in conjunction with, in combination with, or substituted for elements of any of the other embodiments discussed herein and vice versa. Further, it should be understood that the functions, structures, and other descriptions of elements for embodiments described in FIG. 4 may apply to like or similarly named or described elements across any of the figures and/or embodiments described herein and vice versa. Each block of method 400, described herein, comprises a computing process that may be performed using any combination of hardware, firmware, and/or software. For instance, various functions may be carried out by one or more processors comprising processing circuitry execute instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 400 is described, by way of example, with respect to the system of FIG. 1. However, this method may additionally or alternatively be executed by any one system, or any combination of systems, including, but not limited to, those described herein.

As discussed herein in greater detail, the method may include generating a query response in response to a query message comprising a join clause, the query response being generated based at least on joining a sequence of individual join trees of a plurality of join trees, wherein the individual join trees comprise a fact table joined with one or more dimension tables based at least on the join clause.

The method 400, at block B402, includes parsing a join clause of a query message to identify a plurality of database tables corresponding to the join clause. In some embodiments, a user of the relational database system 100 in FIG. 1 may input a query (e.g., the query message) into the relational database system comprising the join clause system to search for data from data records across multiple tables to generate a response to the query. The query submitted to a relational database system may call for the database system to search for data from data records across multiple tables to generate a response to the query. For example, in response to a query 102 submitted to the relational database system 100, the query processor 140 may search the tables 122 for data from data records across multiple tables 122 to generate the query response 150.

The method 400, at block B404, includes classifying, using a score computed based on a normalized cardinality statistic, individual tables of the plurality of database tables into at least one of a first class or a second class. In some embodiments, the first class may comprise one or more fact tables and the second class comprises one or more dimension tables. As an example, in some embodiments, the relational database system 100 comprises a join optimizer 112 evaluates a join clause of the query 102. The join optimizer 112 identifies tables from the relational database 120 that comprise records to be searched to perform the query 102 and categorizes those identified tables as either fact tables or dimension tables based on computing a cardinality (e.g., a normalized cardinality statistic). In some embodiments, the normalized cardinality statistic is computed based on a function of a ratio of the logarithms of table sizes. For example, in some embodiments, a normalized cardinality statistic may be computed as a function of a ratio of the logarithm (e.g., a natural logarithm, a base10 logarithm, or other base logarithm) of the size of a largest table in set of tables identified from the join clause (which may be referred to as a baseline table) and the logarithm of the sizes of other individual tables identified from the join clause. Using the ratio of the logarithms, a score may be computed for individual tables and the tables classified as fact or dimension tables based on the score. The baseline table, by default, may be classified as a fact table. Which of the other table are considered fact tables may be established based on comparing their respective score to a classification threshold. The threshold used for distinguishing fact from dimension tables may be selected based on characteristics of the tables that make up the relational database, and that results in the separation of fact from dimension tables that provides the most relevant query results. In some embodiments, the normalized cardinality statistic may be computed based on a function of a Z-Score of table sizes. For the purpose of determining whether to classify a table as a fact table or dimension table, the z-score for a table may be used to determine whether the table is unusually large (e.g., a fact table) or relatively small (e.g., a dimension table). For a relational database, the z-scores of small tables can be expected to cluster together while the z-scores for large tables spread out with a distance far from the mean value and the cluster of small tables. A baseline z-score may be established as the minimum z-score (e.g., min-zs=min (z-scores)). Each table that has a z-score within the range of [min_zs−ε, min_zs+ε] may be classified as a dimension table, and the others classified as fact tables.

The method 400, at block B406, includes generating a plurality of join trees, where individual join trees of the plurality of join trees comprise a table of the first class joined with one or more tables of the second class based at least on the join clause. A join tree may be generated for each respective fact table. For example, using the fact tables and dimension tables, the join optimizer 112 generates a plurality of deconstructed query join trees 114. Each join tree of the plurality of deconstructed query join trees 114 may represent the joining of a fact table with one or more dimension tables, based on join operations defined by the join clause of the query 102. Each respective join tree includes the dimension tables from the set of dimension tables that the join clause specifies are to be joined to the fact table for that join tree. Within a join tree, the join optimizer may attempt to join the dimension tables to a fact table in a specific order that yields a more efficient processing of the join clause. In some embodiments, an individual join tree of the plurality of join trees may be generated based on a sequence determined based at least on dimension table size. For example, the smallest dimension tables are sequentially joined with the fact table first and followed by the joining of dimension tables of increasing size. When the query specifies that a filter is to be applied to limit the query, then one or more dimension tables may be filtered down in size to include records that satisfy the filter. As such, the number of records from a filtered table relevant to the join are less than the full size of the filtered table. Accordingly, in some embodiments, a filter selectivity factor (e.g., a value between 0 and 1) may be applied to the full size of a filtered dimension table to produce an effective size for that dimension table that at least roughly reflects the effects of filtering on the table's size. The method may therefore include determining a sequence to join the table of the first class joined with the one or more tables of the second class based at least on a filter selectivity factor applied to filtered tables of the one or more tables of the second class. The sequence to join the table of the first class with the one or more tables of the second class may be based at least on a combination of effective table size of filtered tables and an order of unfiltered tables indicated by the join clause. Once the effective size for each dimension table is computed, the join optimizer may produce a first list that ranks the filtered dimension tables in increasing order of effective size and a second list that ranks the unfiltered dimension table in the order in which they were specified by the join clause of the query. The final ranking of dimension tables for the join tree may then be sequentially produced by selecting the smallest of the two dimension tables currently at the top of the two lists and adding that table to the sequence of dimension tables of the join trees. In some embodiments, the sequence to join the fact table with the one or more dimension tables may be determined based at least on a combination of effective table size of filtered dimension tables and an order of unfiltered dimension tables indicated by the join clause.

The method 400, at block B408, includes generating a reordered join solution representing a join of the plurality of join trees. As described with respect to FIGS. 1, 2 and 3, the join optimizer 112 may generate a reordered join solution 132 by sequentially joining the individual join trees from the plurality of deconstructed query join trees 114. The reordered join solution may be generated using a ranking of join trees determined based at least on a size of the table of the first class so that the join trees may be sequentially joined based on the size of the fact table. Alternatively, the reordered join solution may be generated using the order in which the fact tables appear in the join clause of the query. In some embodiments, the reordered join solution may further include one or more joins with one or more residual tables. As discussed herein, after joining of the join trees to form the reordered join solution, one or more tables specified in the original join clause may remain un-joined and such tables may be referred to as residual tables. The join optimizer may extend the reordered join solution by adding a join between the residual tables and reordered join solution. If the residual tables can be joined with the reordered join solution so that no un-joined table remains from the tables specified by the join clause of the query, then an updated query based on the original query and the reordered join solution may be processed by the database system to produce the query response.

The method 400, at block B410, includes executing an updated query based at least on the reordered join solution to generate a query response responsive to the query message. The method may include generating a query response in response to the query message based at least on the reordered join solution. An updated (e.g., modified, revised, etc.) query 130 may be produced by the join optimizer 112 based on the original query 102 and the reordered join solution 132. The query processor 140 of the relational database system 100 may input or otherwise receive the updated query 130 and access the tables 122 of the relational database 120 to executed the updated query and produce a query response 150 responsive to the original query 102. The query response 150 may be displayed to a data presentation component (e.g., such as presentation component(s) 518 or other human-machine interface (HMI)) and/or saved to a memory or data storage device for further processing. By generating the response using the joins of the reordered join solution, the processioning of the query may be achieved more efficiently with respect to time, processing cycles, memory usage, and/or other compute considerations because the generation of intermediate data and tables is optimized so that as each join is performed, a smaller amount of data needs to be stored and processed as compared to what would be generated by the original join order indicated by the join clause.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, generative AI, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational artificial intelligence (AI) operations, systems implementing one or more language models-such as one or more large language models (LLMs), systems for performing light transport simulation, systems for performing collaborative content creation for 3D assets, systems implemented at least partially using cloud computing resources, and/or other types of systems.

Example Computing Device

Figure 5:
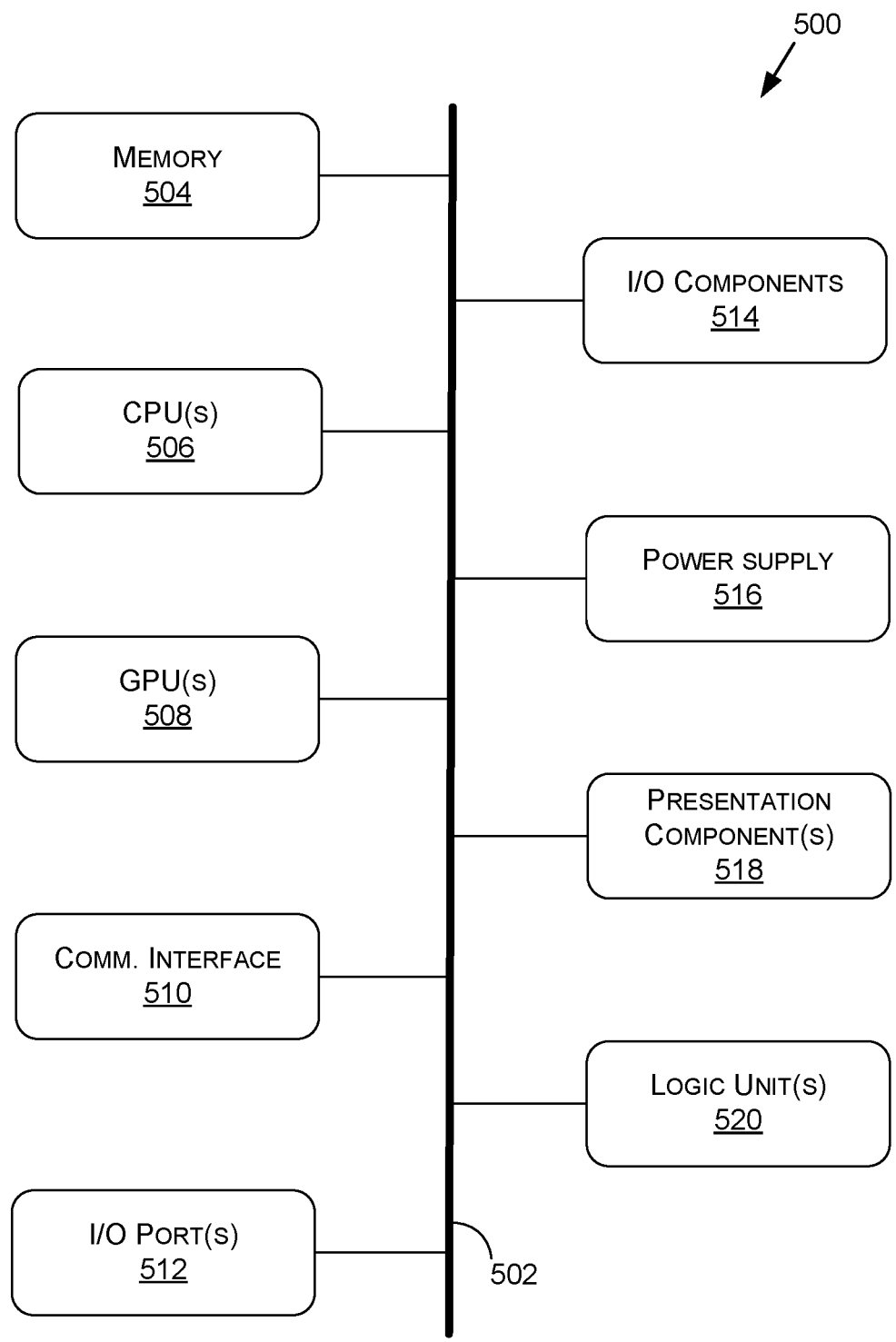
FIG. 5 is a block diagram of an example computing device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For non-limiting examples, one or more of the GPUs 508 may comprise one or more vGPUs, one or more of the CPUs 506 may comprise one or more vCPUs, and/or one or more of the logic units 520 may comprise one or more virtual logic units. As such, a computing device(s) 500 may include discrete components (e.g., a full GPU dedicated to the computing device 500), virtual components (e.g., a portion of a GPU dedicated to the computing device 500), or a combination thereof. In some embodiments, one or more aspects of the relational database system 100 and/or join optimizer 112 may be implemented with one or more of computing device(s) 500.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508. In some embodiments, one or more aspects of the relational database system 100 and/or join optimizer 112 may be implemented as code executed by one or more of the CPU(s) 506, GPU(s) 508, and/or the logic unit(s) 520. Examples of the logic unit(s) 520 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that enable the computing device 500 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., a memory of) one or more GPU(s) 508.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, DPUs, etc.), and output the data (e.g., as an image, video, sound, etc.). In some embodiments, the presentation component(s) 155 may comprise one or more of the presentation component(s) 518.

Example Data Center

Figure 6:
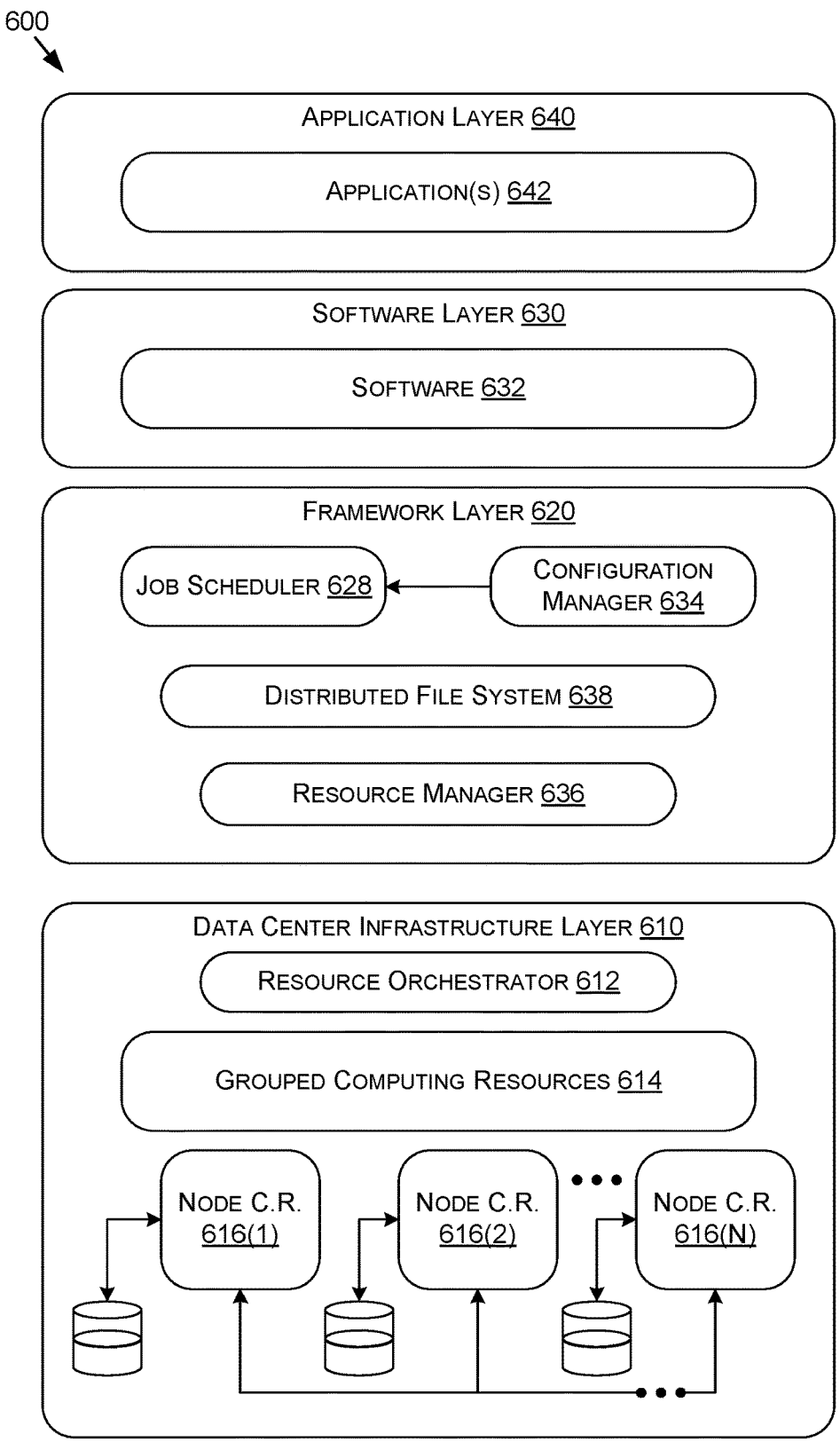
FIG. 6 is a block diagram of an example data center suitable for use in implementing some embodiments of the present disclosure.

FIG. 6 illustrates an example data center 600 that may be used in at least one embodiments of the present disclosure. The data center 600 may include a data center infrastructure layer 610, a framework layer 620, a software layer 630, and/or an application layer 640. In some embodiments, one or more aspects of the relational database system 100 and/or join optimizer 112 may be implemented using data center 600.

As shown in FIG. 6, the data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 616(1)-616(N) may correspond to a server having one or more of the above-mentioned computing resources. In addition, in some embodiments, the node C.R.s 616(1)-6161(N) may include one or more virtual components, such as vGPUs, vCPUs, and/or the like, and/or one or more of the node C.R.s 616(1)-616(N) may correspond to a virtual machine (VM). In some embodiments, one or more aspects of the relational database system 100 and/or join optimizer 112 may be implemented as code executed by one or more of the node C.R.s 616(1)-6161(N).

In at least one embodiment, grouped computing resources 614 may include separate groupings of node C.R.s 616 housed within one or more racks (not shown), or many racks housed in data centers at various geographical locations (also not shown). Separate groupings of node C.R.s 616 within grouped computing resources 614 may include grouped compute, network, memory or storage resources that may be configured or allocated to support one or more workloads. In at least one embodiment, several node C.R.s 616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 612 may configure or otherwise control one or more node C.R.s 616(1)-616(N) and/or grouped computing resources 614. In at least one embodiment, resource orchestrator 612 may include a software design infrastructure (SDI) management entity for the data center 600. The resource orchestrator 612 may include hardware, software, or some combination thereof.

In at least one embodiment, as shown in FIG. 6, framework layer 620 may include a job scheduler 628, a configuration manager 634, a resource manager 636, and/or a distributed file system 638. The framework layer 620 may include a framework to support software 632 of software layer 630 and/or one or more application(s) 642 of application layer 640. The software 632 or application(s) 642 may respectively include web-based service software or applications, such as those provided by Amazon Web Services, Google Cloud and Microsoft Azure. The framework layer 620 may be, but is not limited to, a type of free and open-source software web application framework such as Apache Spark™ (hereinafter "Spark") that may utilize distributed file system 638 for large-scale data processing (e.g., "big data"). In at least one embodiment, job scheduler 628 may include a Spark driver to facilitate scheduling of workloads supported by various layers of data center 600. The configuration manager 634 may be capable of configuring different layers such as software layer 630 and framework layer 620 including Spark and distributed file system 638 for supporting large-scale data processing. The resource manager 636 may be capable of managing clustered or grouped computing resources mapped to or allocated for support of distributed file system 638 and job scheduler 628. In at least one embodiment, clustered or grouped computing resources may include grouped computing resource 614 at data center infrastructure layer 610. The resource manager 636 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 638 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 634, resource manager 636, and resource orchestrator 612 may implement any number and type of self-modifying actions based on any amount and type of data acquired in any technically feasible fashion. Self-modifying actions may relieve a data center operator of data center 600 from making possibly bad configuration decisions and possibly avoiding underutilized and/or poor performing portions of a data center.

The data center 600 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 600. In at least one embodiment, trained or deployed machine learning models corresponding to one or more neural networks may be used to infer or predict information using resources described above with respect to the data center 600 by using weight parameters calculated through one or more training techniques, such as but not limited to those described herein.

In at least one embodiment, the data center 600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500. In addition, where backend devices (e.g., servers, NAS, etc.) are implemented, the backend devices may be included as part of a data center 600, an example of which is described in more detail herein with respect to FIG. 6.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising processing circuitry to:
   parse a join clause of a query message to identify a plurality of database tables corresponding to the join clause;
   classify, using a score computed based on a normalized cardinality statistic, individual tables of the plurality of database tables into at least one of a first class or a second class;
   generate a plurality of join trees, where individual join trees of the plurality of join trees comprise a table of the first class joined with one or more tables of the second class based at least on the join clause, wherein for at least one of the individual join trees, one or more tables of the second class are sequentially joined to the table of the first class based at least on a ranking of respective increasing size of the one or more tables of the second class;

generate a reordered join solution representing a sequential join of the individual join trees of the plurality of join trees; and execute an updated query based at least on the reordered join solution to generate a query response responsive to the query message;

wherein two or more of the individual join trees of the plurality of join trees are sequentially joined based on an order of increasing size of their respective table of the first class.

2. The one or more processors of claim 1, wherein the one or more processors are further to generate an individual join tree of the plurality of join trees based on a sequence, the sequence being determined based at least on table size.

3. The one or more processors of claim 1, wherein the one or more processors are further to determine a sequence to join the table of the first class with the one or more tables of the second class based at least on a filter selectivity factor applied to filtered tables of the one or more tables of the second class.

4. The one or more processors of claim 1, wherein the one or more processors are further to determine a sequence to join the table of the first class with the one or more tables of the second class based at least on a combination of effective table size of filtered tables and an order of unfiltered tables indicated by the join clause.

5. The one or more processors of claim 1, wherein the normalized cardinality statistic is computed based on a function of a ratio of logarithms of table sizes.

6. The one or more processors of claim 1, wherein the normalized cardinality statistic is computed based on a function of a Z-Score of table sizes.

7. The one or more processors of claim 1, wherein the one or more processors are further to generate the reordered join solution further based on a join of the reordered join solution with one or more residual tables.

8. The one or more processors of claim 1, wherein the first class comprises fact tables and the second class comprises dimension tables.

9. The one or more processors of claim 1, wherein the processing circuitry is comprised in at least one of:
   a control system for an autonomous or semi-autonomous machine;
   a perception system for an autonomous or semi-autonomous machine;
   a system for performing simulation operations;
   a system for performing digital twin operations;
   a system for performing light transport simulation;
   a system for performing collaborative content creation for three-dimensional assets;
   a system for performing deep learning operations;
   a system for performing remote operations;
   a system for performing real-time streaming;
   a system for generating or presenting one or more of augmented reality content, virtual reality content, or mixed reality content;
   a system implemented using an edge device;
   a system implemented using a robot;
   a system for performing conversational AI operations;
   a system implementing one or more language models;
   a system implementing one or more large language models (LLMs);
   a system for generating synthetic data;
   a system for generating synthetic data using AI;
   a system incorporating one or more virtual machines (VMs);
   a system implemented at least partially in a data center; or
   a system implemented at least partially using cloud computing resources.

10. A system comprising one or more processors to:
classify, based at least on a join clause of a query, individual tables of a plurality of relational database tables as either fact tables or dimension tables using a score computed for the individual tables based on cardinality;

generate a plurality of join trees, wherein individual join trees of the plurality of join trees comprise a fact table joined with one or more dimension tables based at least on the join clause, wherein for at least one of the individual join trees, one or more dimension tables are sequentially joined to the fact table based at least on a ranking of respective increasing size of the one or more dimension tables;

generate an updated query based on the query and a reordered join solution representing a sequential join of the individual join trees of the plurality of join trees; and generate a query response in response to the query based at least on the updated query;

wherein two or more of the individual join trees of the plurality of join trees are sequentially joined based on an order of increasing size of their respective fact table.

11. The system of claim 10, wherein the one or more processors are further to generate an individual join tree of the plurality of join trees based on a sequence determined based at least on dimension table size.

12. The system of claim 10, wherein the one or more processors are further to determine a sequence to join the fact table with the one or more dimension tables based at least on a filter selectivity factor applied to one or more filtered dimension tables.

13. The system of claim 10, wherein the one or more processors are further to determine a sequence to join the fact table with the one or more dimension tables based at least on a combination of effective table size of one or more filtered dimension tables and an order of one or more unfiltered dimension tables indicated by the join clause.

14. The system of claim 10, wherein the score is computed based on a function of a ratio of logarithms of table sizes.

15. The system of claim 10, wherein the score is computed based on a function of a Z-Score of table sizes.

16. The system of claim 10, wherein the one or more processors are further to generate the reordered join solution further based on a join of the reordered join solution with one or more residual tables.

17. The system of claim 10, wherein the system is comprised in at least one of:
   a control system for an autonomous or semi-autonomous machine;
   a perception system for an autonomous or semi-autonomous machine;
   a system for performing simulation operations;
   a system for performing digital twin operations;
   a system for performing light transport simulation;
   a system for performing collaborative content creation for three-dimensional assets;

a system for performing deep learning operations;
a system for performing remote operations;
a system for performing real-time streaming;
a system for generating or presenting one or more of augmented reality content, virtual reality content, or mixed reality content;
a system implemented using an edge device;
a system implemented using a robot;
a system for performing conversational AI operations;
a system implementing one or more language models;
a system implementing one or more large language models (LLMs);
a system for generating synthetic data;
a system for generating synthetic data using AI;
a system incorporating one or more virtual machines (VMs);
a system implemented at least partially in a data center; or
a system implemented at least partially using cloud computing resources.

18. A method comprising:

generating, using a database system comprising one or more processors, a query response in response to a query message submitted to the database system and comprising a join clause, the query response being generated based at least on joining a sequence of individual join trees of a plurality of join trees, wherein at least one of the individual join trees respectively comprises a fact table joined with one or more dimension tables based at least on the join clause and based at least on a ranking of increasing respective dimension table size;

wherein the individual tables of the plurality of join trees are classified with a fact table classification or a dimension table classification based on computing a cardinality; and wherein the query response is generated based at least on the database system processing an updated query comprising a reordered join solution comprising a sequential join of the individual join trees, wherein two or more of the individual join trees of the plurality of join trees are sequentially joined based on an order of increasing size of their respective fact table.

* * * * *